H. W. HACKER.
MEASURING INSTRUMENT.
APPLICATION FILED JUNE 20, 1918.
1,307,775.
Patented June 24, 1919.
2 SHEETS—SHEET 2.
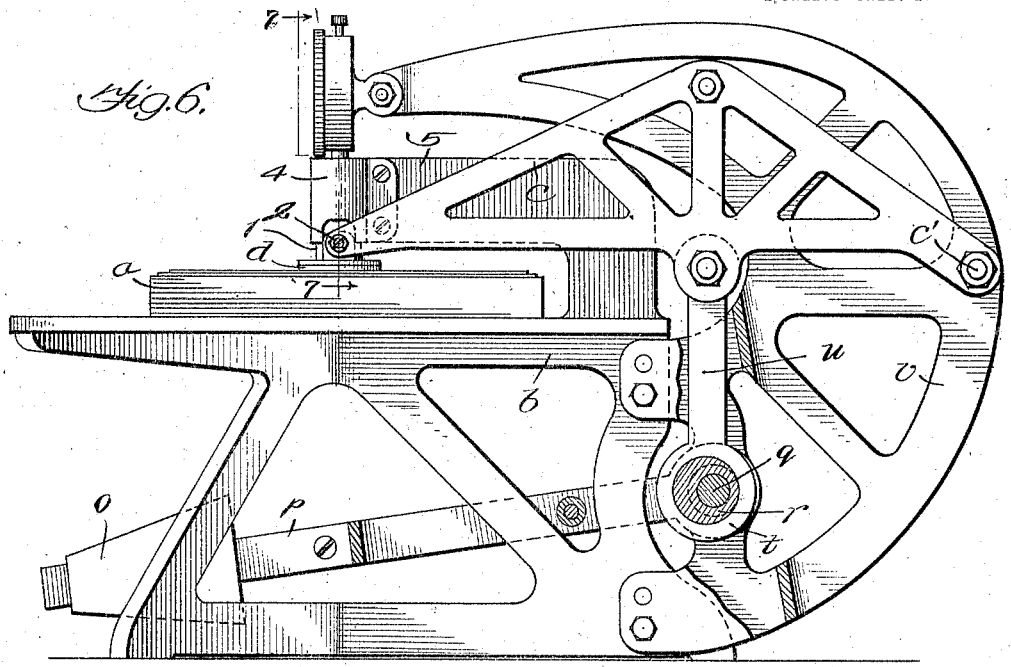
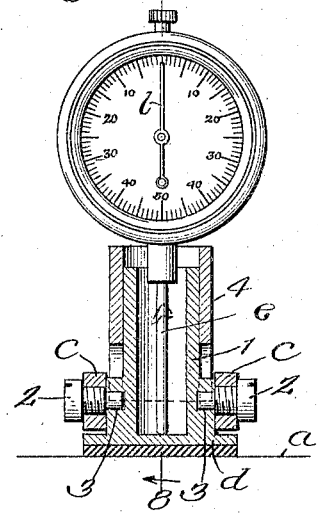
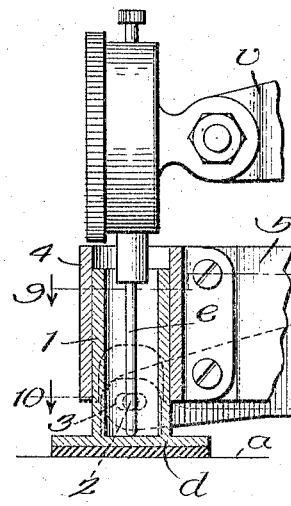
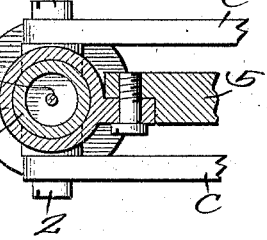
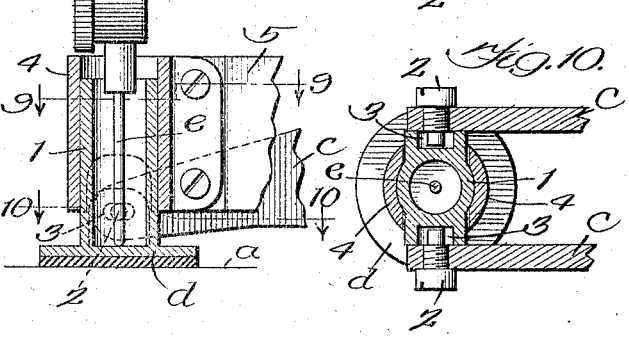
Inventor:
Horace W. Hacker

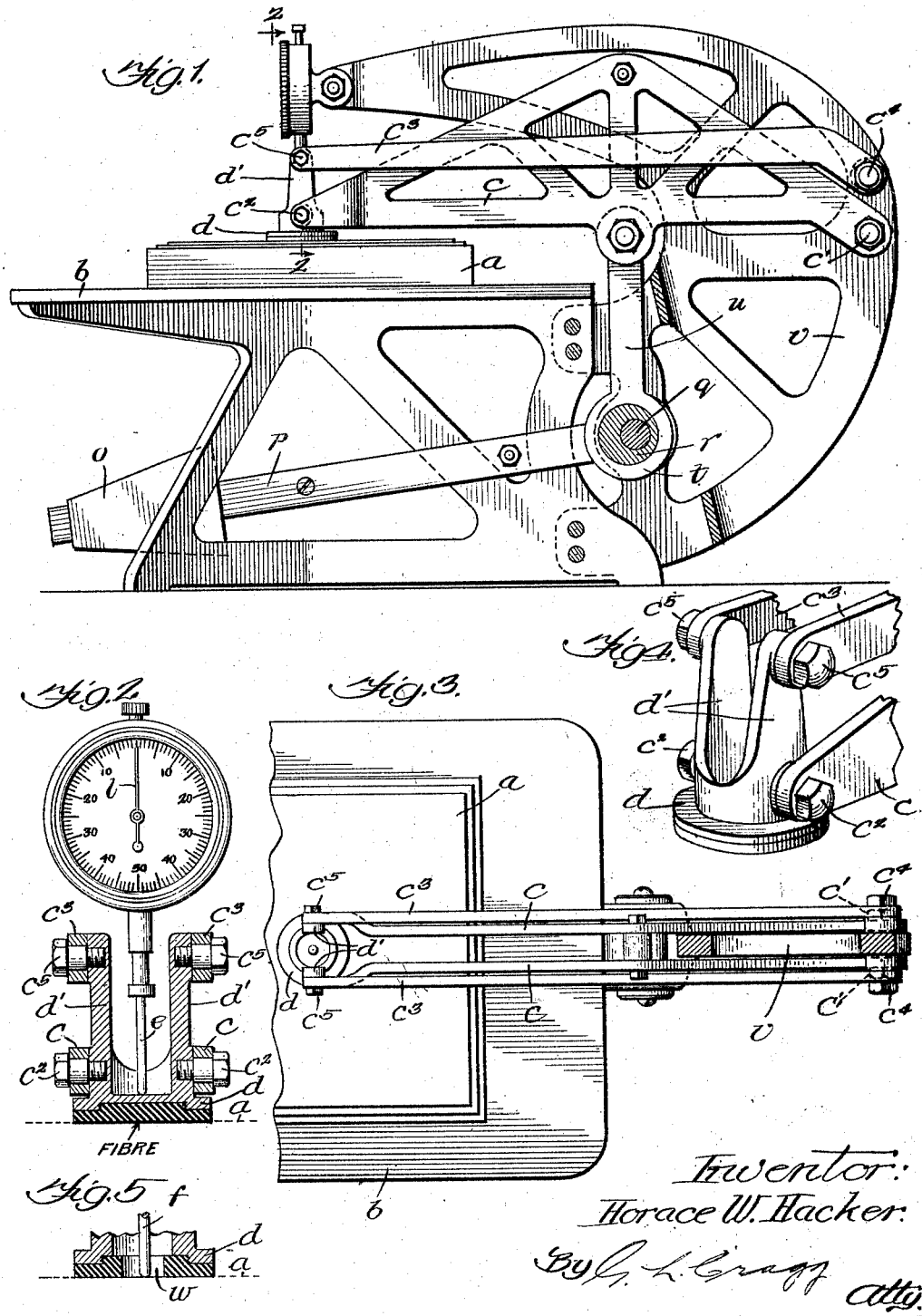

UNITED STATES PATENT OFFICE.

HORACE W. HACKER, OF CHICAGO, ILLINOIS.

MEASURING INSTRUMENT.

1,307,775.  Specification of Letters Patent.  Patented June 24, 1919.

Application filed June 20, 1918. Serial No. 241,081.

*To all whom it may concern:*

Be it known that I, HORACE W. HACKER, a citizen of the United States, residing at Chicago, in the county of Cook and State of Illinois, have invented a certain new and useful Improvement in Measuring Instruments, of which the following is a full, clear, concise, and exact description.

My invention relates to those machines or devices for measuring the heights or thicknesses of objects as modified by heavy working pressures when such objects are absent from their normal working environment for the purpose of such measurement. Such a machine usually employs a micrometric gage and means for exerting that degree of heavy pressure upon that portion of the object being measured which such portion would receive in its actual working environment, the micrometric gage preferably having means for supplying a moving element thereof with an extremely light degree of pressure which is sufficient to maintain the gage in measuring relation to the object whose working height is being measured but which gage desirably has no material influence in causing the portion of the object being measured to assume the height which such object has in its working condition. I do not wish to limit the improvement of my invention to these characteristics. Such machines are of peculiar service in comparing the working heights of printing plates and their mountings, which heights notably vary under working conditions as compared with their heights when not under working pressure.

Hitherto the object whose working height or thickness is to be determined was placed between an engaging element and a follower, the follower having been universally mounted in order to be self-adjusting to have its engaging face in uniform contact with and perfectly parallel to the face of the object engaged by the follower in order that working-like pressure might be transmitted to the object uniformly throughout the area of contact of the follower with the object being measured.

Where it is desired to produce conditions more nearly approaching the working condition of the object being measured, I provide means acting positively upon the follower for maintaining its object engaging face in absolute parallelism with the face or top of the engaging element or support that is in engagement with the other side or bottom of such object. If there are inequalities in the height of the object being measured the normal influence thereof is more nearly retained if the surfaces between which the object is gripped are positively maintained in absolute parallelism, which parallelism could not be maintained if the follower were automatically adjustable by the object itself to have it conform with the top of the object irrespective of the relation of the follower to the top of the support that is underneath the object. The positively positioned follower is thus more analogous to the element that exerts working pressure on the object in the normal working environment of the object.

The means which I preferably employ for thus positively positioning the follower resides in a lever through which working-like pressure is applied to the follower and with which lever the follower is pivotally connected, and a pivoted link with which the follower is also pivotally connected, the points of pivotal connection of the follower with said lever and link and the points of pivotal connection of said lever and link with their support being coincident with the corners of a parallelogram whereby the engaging face of the follower is maintained in parallelism with the opposing face of the object support.

I will explain my invention more fully by reference to the accompanying drawings showing different embodiments thereof and in which Figure 1 is a view in elevation, partially in section, illustrating a measuring machine constructed in accordance with the invention; Fig. 2 is a sectional view on line 2—2 of Fig. 1; Fig. 3 is a plan view of a part of the structure illustrated in Fig. 1; Fig. 4 is a perspective view of a part of the machine; Fig. 5 is a view illustrating a modification of the lower part of the structure that is illustrated in Fig. 2; Fig. 6 is a side view illustrating a modification of the construction of my invention; Fig. 7 is a sectional view on line 7—7 of Fig. 6; Fig. 8 is a sectional view on line 8—8 of Fig. 7; Fig. 9 is a sectional view on line 9—9 of Fig. 8; and Fig. 10 is a sectional view on line 10—10 of Fig. 8.

Like parts are indicated by similar characters of reference throughout the different figures.

The invention will first be described in connection with Figs. 1 to 4 inclusive.

The object $a$ whose working height or thickness is to be determined is rested upon or engaged with a support or engaging element $b$. A follower support $c$ carries a follower $d$ pivoted thereon for engaging the top or other opposing surface of the object $a$, the under and engaging face of this follower being accurately planed to lie perfectly flat upon the top surface of the object $a$. The top surface of the engaging element $b$ also presents a plane surface on which the object rests. The follower support $c$ is suitably mounted so that it may be lifted for the interposition of the object $a$ between the abutment $d$ and support $b$.

In accordance with my invention the follower $d$ is positively positioned, when its bottom surface is in engagement with the object being measured, to have this bottom surface in perfect parallelism with the top surface of the support or engaging element $b$ whereby such bottom surface of the follower is maintained in heavy contact with the top surface of the object which is being engaged by the follower, this result being accomplished without any adjusting influence of the object upon the follower, but rather by means acting positively upon the follower independently of the object. The follower support $c$ is pivotally connected at $c^1$ with a support $v$ and at $c^2$ with the stem $d^1$ of the follower $d$. A supplemental follower support or positioner $c^3$ is pivotally connected at $c^4$ with said support $v$ and at $c^5$ with the stem $d^1$ of the follower $d$. The two supports $c$, $c^3$ are essentially of the same length and essentially parallel, their pivotal points $c^1$, $c^2$, $c^4$ and $c^5$ defining the corners of a parallelogram. By means of the illustrated mechanism the bottom surface of the follower $d$ is, in all positions of the follower, maintained parallel with the top surface of the support or engaging element $b$, although it is only essential that the bottom face of the follower $d$ and the top face of the support $b$ be in parallelism when the follower is actually engaged with the object whose working height is to be measured. Working-like pressure is applied to the object with the coöperation of the follower $d$ and the support $b$ in any suitable way, the method hereinafter set forth being preferred.

A micrometric gage is preferably employed to note the measurements. The gage illustrated is preferably mounted independently of the support $c$, $c^3$. It includes a vertically disposed plunger depressed downwardly by a light spring, as set forth in United States patent to James B. Replogle, No. 1,171,646, dated February 15, 1916, to maintain it in contact with the top end of the abutment $d$ irrespective of the vertical position of element $d$.

In using the device it is customary to compare the heights of the objects with a standard height, to which end an object of standard height is first interposed between and simultaneously engaged with the top of the support $b$ and the bottom face of the follower abutment $d$ whereafter the gage is adjusted to bring the zero mark of the dial scale into register with the indicating end of the indicator $l$. After the machine has thus been adjusted the object of standard height is removed to permit of the substitution therefor of objects whose heights are to be compared with the standard height. The extent of the departure of the object from the standard height is indicated by the departure of the needle $l$ from its zero or normal position.

The scale divisions desirably represent each a thousandth of an inch. For example, if the object whose height or thickness is being measured should lack five one thousandths of an inch of the standard height, the indicating needle $l$ will come to rest five scale divisions in a counter-clockwise direction from normal. If the height or thickness of the object being measured should exceed the standard height say ten one thousandths of an inch, the indicating needle $l$ will come to rest ten scale divisions in a clockwise direction from normal.

If there should be inequalities in the height or thickness of the object being measured the influence of such inequalities in the working environment of the object will approximately be noted in the measurement effected by my measuring device since the follower, being maintained in parallelism with the top of the support $b$, is very analogous to the element that co-acts with the object to exert working pressure thereon in the normal working environment of the object.

I have illustrated and thus far specifically described a device for measuring the thickness or height of plates or other objects having approximately flat faces, though it is obvious that objects having engaging surfaces of other form may be measured by devices embracing my invention.

The device of my invention is particularly well adapted to the measurement of the heights of printing plates and their mountings singly or combined whether used in flat bed or other types of presses and when the device is adapted to such or similar purposes the follower $d$ is desirably applied to the object being measured with a heavy pressure preferably substantially equal to the pressure to which such object is subject by an equivalent area of a coöperating part in the normal working environment of such object, whereby the height or thickness of the object and various portions of the object is taken as such height is modified by the working pressure to which such object is subject. To this end means are supplied, in addition to the micrometric gage, for furnishing the desired degree of heavy pressure with which the follower $d$ engages the object $a$. As the invention is embodied in the form shown in the drawings the means for furnishing the desired degree of heavy pressure is in the form of a weight $o$ (furnishing pressure comparatively very heavy with respect to the pressure exerted upon plunger $e$) upon the free end of a crank arm $p$ concentrically mounted upon the stationary shaft $q$. A weight is preferred for furnishing the heavy pressure since such pressure is uniform. The crank arm $p$ is in fixed relation with a portion $r$ whose circular periphery is eccentric with respect to the shaft $q$, this eccentric being thus in fixed angular relation to the crank arm $p$. The eccentric $r$ is surrounded by an eccentric strap $t$ at the lower end of a pitman $u$ whose upper end is connected with an intermediate portion of the lever $c$ that is pivotally mounted or fulcrumed upon the mounting bracket $v$ at $c^1$ as hitherto stated, this mounting bracket also carrying the micrometric gage at its forward upper end. When the crank arm $p$ is raised the eccentric will be shifted to raise the support $c$—$c^3$ and when the crank arm $p$ is lowered the support $c$—$c^3$ will be consequently lowered through the intermediation of the eccentric, the bottom face of the follower $d$ being positively maintained parallel with the top of the engaging element $b$ by the coaction of the elements $c$—$c^3$. The weight $o$, through the intermediation of the arm $p$, the pitman $u$ and the support $c$—$c^3$ presses the follower $d$ with the desired degree of pressure upon the object $a$ being measured, whereby the particular portion of the object being measured is approximately brought to the thickness or height or form it will assume in its working environment. Each time a new measurement is taken the forward end of the crank arm is lifted to permit of the desired positioning of the object or the portion of the object to be measured whereafter the arm $p$ is gently lowered until the follower $d$ rests upon the object $a$ whereupon the arm $p$ is released to permit the weight $o$ to force the follower $d$ upon the object $a$ with the requisite pressure. It is necessary to lift the arm $p$ each time the object is to be repositioned or replaced since the pressure is so heavy as to prevent the object from being moved without injury to it when the weight $o$ is performing its function.

In Fig. 5 a preferred form is shown in which the follower $f$ instead of resting upon the upper end of the follower $d$, passes through a channel $w$ in the follower $d$ so that the follower $f$ may rest directly upon the object $a$ to measure the height of this object after such height has been modified by the heavy pressure exerted at $d$.

In the construction of Figs. 6 to 10 inclusive, the follower $d$ is rigidly carried at the lower end of a sleeve 1. The follower support $c$ carries two screws 2 whose inner ends are received in slots 3 that are formed in the lower parts of opposite sides of sleeve 1. Said sleeve is confined to movement in a vertical line by means of another sleeve 4 which is carried by a bracket 5 mounted upon the support $b$. The pin and slot connection 2, 3 permits the follower to be elevated and lowered without changing its vertical line of movement while the sleeve 4 positively maintains parallelism of the bottom face of the follower $d$ with the top face of the support $b$.

In the claims I use the term "working-like pressure" meaning thereby a pressure which will so modify the height or thickness or form of the object being measured that the measurement will closely approach such thickness or form of the object when under working pressure in its working environment.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; positive means for maintaining the object engaging faces of the object engaging element and follower in parallelism including two essentially parallel pivotally supported carriers essentially of equal length upon which said follower is pivoted; and a micrometric gage having an actuating element provided with means for causing it to move toward the object as the object is depressed to measure the working height of the object.

2. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; positive means for maintaining the object engaging faces of the object engaging element and follower in parallelism including two essentially parallel pivotally supported carriers essentially of equal length upon which said follower is pivoted; and a measuring device having a measuring element influenced by the object as it is depressed.

3. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; positive means for maintaining the object engaging faces of the object engaging element and follower in parallelism; and a micrometric gage having an actuating element provided with means for causing it to move toward the object as the object is depressed to measure the working height of the object.

4. A machine for measuring the working thickness of objects subject to heavy working pressure including an element for engaging one side of an object that is to be measured; a follower for engaging an opposite side of the object; means for applying heavy working-like pressure to the object through the intermediation of said follower and object engaging element; positive means for maintaining the object engaging faces of the object engaging element and follower in parallelism; and a measuring device having a measuring element influenced by the object as it is depressed.

In witness whereof, I hereunto subscribe my name this 29th day of May A. D., 1918.

HORACE W. HACKER.

Copies of this patent may be obtained for five cents each, by addressing the "Commissioner of Patents, Washington, D. C."